United States Patent

Maag et al.

Patent Number: 5,692,005
Date of Patent: Nov. 25, 1997

[54] SOLID-STATE LASER

[75] Inventors: Robert Maag, Aalen; Heinz Abramowsky, Giengen; Peter Reimer, Ellwangen; Martin Wiechmann, Jena, all of Germany

[73] Assignee: Carl-Zeiss-Stiftung, Heidenheim, Germany

[21] Appl. No.: 611,983

[22] Filed: Mar. 4, 1996

[30] Foreign Application Priority Data

Mar. 4, 1995 [DE] Germany .......... 195 07 625.7

[51] Int. Cl.⁶ .......... H01S 3/091
[52] U.S. Cl. .......... 372/70; 372/19; 372/21; 372/71; 372/72; 372/99; 372/101
[58] Field of Search .......... 372/21, 22, 34, 372/35, 39, 43, 50, 69, 70, 71, 72, 92, 99, 101, 107, 108, 109, 19

[56] References Cited

U.S. PATENT DOCUMENTS

| | | | |
|---|---|---|---|
| 4,884,281 | 11/1989 | Hawthorn et al. | 372/75 |
| 4,910,740 | 3/1990 | Oka | 372/22 |
| 5,181,214 | 1/1993 | Berger et al. | 372/34 |
| 5,187,714 | 2/1993 | Okazaki et al. | 372/36 |
| 5,267,252 | 11/1993 | Amano | 372/34 |
| 5,287,381 | 2/1994 | Hyuga et al. | 372/75 |
| 5,341,388 | 8/1994 | Masuda et al. | 372/36 |

FOREIGN PATENT DOCUMENTS

| | | | |
|---|---|---|---|
| 0557182 | 8/1993 | European Pat. Off. | 372/70 X |
| WO9209127 | 5/1992 | WIPO | 372/70 X |

*Primary Examiner*—Brian Healy

[57] ABSTRACT

A solid-state laser has a rod-shaped laser medium with planar end faces and a pumping radiation source whose pumping radiation reaches the laser medium by means of an optical element arranged in a longitudinal configuration adjacent to a planar end face of the laser medium. The optical element is arranged in thermal contact with a cooling element and is optically dimensioned so as to result in a minimum diameter of the transverse mode profile within the laser resonator.

15 Claims, 1 Drawing Sheet

SOLID-STATE LASER

BACKGROUND OF THE INVENTION

1. Field of the Invention

The present invention relates to a solid-state laser that preferably is optically pumped by means of at least one semiconductor laser.

2. Discussion of Prior Art

An end-pumped solid-state laser is known from U.S. Pat. No. 4,884,281, in which one or more semiconductor lasers or laser diodes are used as a pumping radiation source. Such a solid-state laser is distinguished, in particular, by a high efficiency because an efficient optical excitation of the laser medium is possible by a suitable choice of correspondingly emitting pumping radiation sources. Solid-state lasers conducted in this manner have increasing importance in fields in which there is a demand for stable laser emission, a good transverse beam profile, and the possibility of longitudinal mode selection. Diverse medical applications fall into this category, for example in the field of ophthalmology.

It is known from the above-mentioned US Patent to arrange in the laser resonator an optically non-linear crystal that acts as a frequency multiplier element. It is thereby possible to divide the fundamental wavelength of the respective laser medium by two, three, and so on. For example, the fundamental wavelength 1,064 μm of an Nd:YAG laser medium can be halved by means of a KTP crystal, so that output radiation is in the green spectral region at 532 nm.

However, the higher the desired power of such a solid-state laser, the greater the problems that arise, due to thermal effects in the laser medium. Among other things, formation of so-called thermal lenses in the rod-shaped laser medium falls into this category. This has negative consequences for the efficiency and the beam quality of the overall system. Therefore, greater requirements are placed on cooling such an arrangement. It is known from International Patent Document WO 92/09127 to provide the laser medium of a diode-pumped solid-state laser directly with a cooling medium. However, the disadvantage of this proposed arrangement is that only relatively thin substrates can be cooled.

SUMMARY OF THE INVENTION

The object of the present invention is to avoid the above-mentioned disadvantages of the prior art to provide an end-pumped solid-state laser of high power or high efficiency. A further object of the invention is to provide the option of efficient, high frequency multiplication.

These objects are achieved by a solid-state laser including a laser resonator having a rod-shaped laser medium with end faces, an optical element arranged adjacent an end face of the laser medium and in thermal contact with the laser medium, a pumping radiation source for pumping radiation that reaches the laser medium by means of the optical element and a cooling element arranged in thermal contact with the optical element. The optical element is optically dimensioned such that a transverse mode profile within the laser resonator has a minimum diameter.

According to the invention, an optical element that fulfills a double function is provided within the solid-state laser. First, the optical element is in thermal contact with a cooling element, and ensures additional removal of heat from the rod-shaped laser medium that is in thermal contact with the optical element. It is thereby possible to provide a series of cooling configurations for cooling the optical element. Second, the cooled optical element is optically dimensioned such that a minimum diameter of the transverse mode profile of the laser beam is formed within the laser resonator. This means that the optical element that is arranged in a longitudinal configuration with respect to the rod-shaped laser medium also acts as the end-mirror for the respective laser resonator.

This results in an overall simpler construction, with only a few individual elements in the resonator of the solid-state laser according to the invention. Costly adjusting work is not necessary. Additionally, the thermal problems that usually arise in the laser medium are reduced.

BRIEF DESCRIPTION OF THE DRAWING

Further advantages and also the details of the solid-state laser according to the invention will become apparent from the following description of a preferred embodiment, with reference to the accompanying drawing, in which.

DETAILED DESCRIPTION OF A PREFERRED EMBODIMENT

Figure 1:
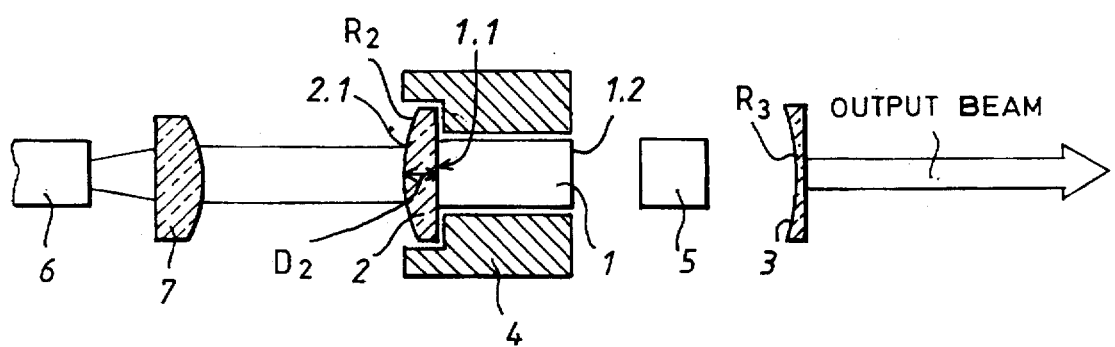
FIG. 1 shows a schematic representation of a preferred embodiment of the solid-state laser according to the invention.

The solid-state laser according to the invention comprises a rod-shaped laser medium (1) with end-faces (1.1, 1.2), which are planar in the embodiments shown. In the embodiment shown, the laser medium consists of YAG (yttrium aluminum garnet) doped with Nd ions. The selected rod length is about 10 mm, and the rod diameter is about 3 mm. The resonator of the solid-state laser is formed by a partially transparent decoupling mirror (3) and an end-mirror (2.1) of high reflectivity. The end-mirror is integrated into the optical element (2). The optical element (2) is arranged directly adjacent to an end-face (1.1) of the rod-shaped laser medium (1). The optical element (2) is thereby in thermal contact with the rod-shaped laser medium. In the embodiment shown, the optical element (2), which is embodied as a lens, and the rod-shaped laser medium (1) are connected together by means of a suitable cement. Alternatively, it would be possible to provide an immersion liquid between the lens (2) and the rod-shaped laser medium (1). Moreover, the lens (2) can be wringed to the laser medium (1). If the lens (2) is wringed to the laser medium (1), a relatively small jump in the refractive index can be attained between the materials used.

If the two first named possibilities are used for the arrangement of the lens (2) and the laser medium (1), a so-called reduction of cement reflection is required. An anti-reflection layer must be applied to one or both boundary surfaces depending upon the combination of laser medium (1) and lens (2) material.

In the embodiment with a wringed to lens, SF6 glass or SFL6 glass may be used as the lens material in combination with the Nd-YAG rod-shaped laser medium (1). Such glasses may be obtained from the firm of Schott Glaswerke, Mainz, Germany under these trade names.

A known laser diode array may be used as the pumping radiation source (6) for the optical excitation of the solid-state laser. Such solid-state laser diode arrays supply a pumping power of about 10–15 W at a pumping wavelength of 807 nm. A wide selection of such laser diode arrays may be obtained from SDL Company (Spectra Diode Labs).

Semiconductor laser configurations of greater or smaller power may be used as the pumping radiation source(s) depending upon the required output power of the solid-state laser.

A beam-shaping optics (7) is arranged in front of the laser diode array (6) in the embodiment shown. The beam-shaping optics (7) substantially collimates the divergent emitted pumping radiation before it reaches the laser medium (1) to be excited, via the optical element (2).

Figure 2:
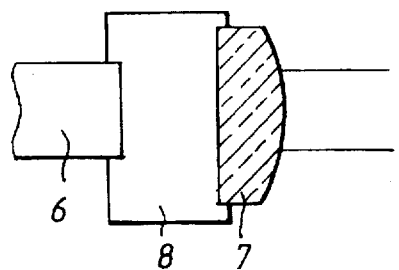
FIG. 2 shows the differing detail of a further preferred embodiment.

As an alternative to the embodiment of FIG. 1 (that provides direct transmission of the pumping radiation) the pumping radiation may also be transmitted via suitable fiber optics for coupling into the laser medium. This is shown in the embodiment of FIG. 2, in which a fiber optics (8) is arranged between the pumping radiation source (6) and the beam-shaping optics (7), the other components of this embodiment being identical to the embodiment of FIG. 1.

The optical element (2) in the form of a lens is mounted together with the rod-shaped laser medium (1) in a mount (4). The mount (4) thereby acts as a cooling element, by means of which heat can be removed from the laser medium (1). Removal of heat thus takes place both via the surface of the laser medium (1) and via the lens (2) in the direction of the mount (4). The mount (4) acts as a passive cooling element with a large surface, by means of which the resulting heat is given up to the surroundings. A suitable material for the mount (4) is copper, or other materials having high thermal conductivity.

Besides a purely passive cooling element, it is also possible to provide active temperature stabilization of the cooling element. Namely, in the embodiment shown in FIG. 1, the mount (4) of the laser rod (1) and the lens (2). This may take place by means of a conventional Peltier element that is arranged in thermal contact with the cooling element. In this way, the cooling element may be kept at a constant, defined temperature by means of a corresponding temperature control of the Peltier element. The cost of the required cooling system depends on the desired output power of the solid-state laser.

According to the invention, the optical element or lens (2) within the solid-state laser ensures a further important function beyond additional heat removal. The curved exterior surface (2.1) of the lens (2) acts as a resonator end-mirror that is optically dimensioned such that the transverse mode profile of the laser beam formed within the resonator is constricted. This constriction is made possible by a corresponding shaping of the outer face (2.1) of the lens (2) in an aspheric or spherical shape.

To attain the desired transverse mode profile within the resonator, the radius of curvature of the output mirror (3) and the resonator length must be taken into account in setting the corresponding dimensions.

With a length of the rod-shaped laser medium (1) of 10 mm, and a diameter of 3 mm, the radius of curvature ($R_2$) of the lens (2) has a value of $R_2$=200 mm. The radius of curvature of the output mirror (3) has a value of $R_3$=60 mm and the total resonator length has a value of 128 mm.

Another important advantage of the present invention is the ability to configure the lens (2) with a diameter D2 of about 5–10 mm in a conventional manner, with relatively few problems in order to attain the desired optical effect. In the case of the corresponding dimensioning of the small rod end surface (1.1), additional difficulties of manufacturing technologies would arise in fitting, absent the present invention. However, the use of commercially available laser rods with planar end faces is thus possible without problems, according to the present invention.

The lens surface (2.1) acting as a resonator end mirror is provided with a coating that is highly reflective for the fundamental wavelength of the laser. That is, highly reflective for the wavelength of 1,064 μm. For a pumping radiation of 807 nm, the lens (2) is designed to be as little reflective as possible to ensure a high degree of transmission through the lens (2).

A frequency multiplier element (5) is arranged in the resonator at the place of maximum constriction of the transverse mode profile. An optically non-linear crystal, such as KTP of LBO, may be used for the frequency multiplier element (5). In the case of a Nd:YAG laser medium, the frequency multiplier element (5) ensures halving of the fundamental wavelength of 1.064 μm, i.e., the output beam will have a wavelength of 532 nm, in the green spectral region. This is required for various applications in the ophthalmological field.

This arrangement of the frequency multiplier element (5) is optional in the solid-state laser. It can be selectively provided or not provided.

We claim:

1. A solid-state laser including a laser resonator comprising:

a rod-shaped laser medium (1) having end faces (1.1, 1.2), an optical element (2) arranged adjacent an end face of and in thermal contact with said laser medium (1), a pumping radiation source (6) for pumping radiation that reaches said laser medium (1) by means of said optical element (2), said optical element (2) being optically dimensioned such that a minimum diameter of a transverse mode profile results within said laser resonator and having at least one optically effective surface that faces said pumping radiation source (6) and is curved to act as an end mirror for a fundamental wavelength of said laser resonator.

2. The solid-state laser according to claim 1, wherein said optical element (2) is embodied as a lens.

3. The solid-state laser according to claim 1, wherein said optical element (2) and said laser medium (1) are comprised of material having substantially similar refractive indices.

4. The solid-state laser according to claim 2, wherein one of said end faces (1.1, 1.2) of said laser medium (1) is planar, and said lens (2) has a plano-convex profile with a planar side that faces said planar end face (1.1) of said rod-shaped laser medium (1).

5. The solid-state laser according to claim 1, wherein said optically effective surface of said lens (2) has low reflectivity for a pumping wavelength.

6. The solid-state laser according to claim 1, wherein said optically effective surface of said lens (2) is aspherically curved.

7. The solid-state laser according to claim 3, wherein said optical element (2) and said laser medium (1) are cemented together, further comprising a layer that reduces cement reflection.

8. The solid-state laser according to claim 1, further comprising a frequency multiplier element (5) included in said resonator.

9. The solid-state laser according to claim 1, wherein said cooling element (4) comprises a cooled mount and said optical element (2) is arranged in said cooled mount (4).

10. The solid-state laser according to claim 9, wherein said cooled mount (4) is actively temperature-stabilized.

11. The solid-state laser according to claim 9, wherein said cooled mount(4) is passively temperature-stabilized.

12. The solid-state laser according to claim 1, wherein said pumping radiation source (6) comprises at least one semiconductor laser.

13. The solid-state laser according to claim 12, further comprising fiber optics (8) for transmission of said pumping radiation arranged between said semiconductor laser and said laser medium (1).

14. The solid-state laser according to claim 8, wherein said frequency multiplier element (5) comprises an optically non-linear crystal.

15. The solid-state laser according to claim 14, wherein said optically non-linear crystal is selected from the group consisting of KTP and LBO crystals.

\* \* \* \* \*